Dec. 22, 1970  J. PENRAAT ET AL  3,548,517

SELF-SCORING INSTRUCTION BOOK

Filed July 9, 1968

INVENTOR.
JAAP PENRAAT
BY JACK DEVEAU

ATTORNEY

United States Patent Office 3,548,517
Patented Dec. 22, 1970

3,548,517
SELF-SCORING INSTRUCTION BOOK
Jaap Penraat, 315 Central Park West 10025, and Jack Deveau, 240 W. 73rd St. 10023, both of New York, N.Y.
Filed July 9, 1968, Ser. No. 743,449
Int. Cl. G09b 3/06
U.S. Cl. 35—9      3 Claims

ABSTRACT OF THE DISCLOSURE

A self-scoring instruction book constituted by a stack of loose sheets partially received within a box-like pocket having a row of holes therein overlying the margin of the sheets. Printed on each sheet is instructional data or a problem followed by multi-choice answers, only one of which is correct, or both data and a problem, the number of choices in the series of possible answers being equal to the number of holes in the row. Punched into the margin of each sheet is a row of holes which lie in registration with those in the pocket, one hole being extended to the edge of the sheet to define an open slot whose position corresponds with the position of the correct answer in the series thereof, such that when a probe is inserted by a student into that hole in the pocket which registers with the slot in the sheet, this indicates that the student has answered correctly, and he is free to remove the sheet from the pocket to advance his lesson, but if the probe is inserted in the wrong pocket hole, it engages a hole in the sheet to pin the sheet against removal.

---

This invention relates generally to self-scoring instruction books, and more particularly to a book adapted to provide instructions at a rate which depends on the ability of the student to absorb the material presented.

In one known form of self-scoring teaching apparatus, the student is not only able to determine whether his answer to a given problem is correct, but he is rewarded for giving a correct answer and punished if he fails to do so. In apparatus of this type, the student is able to advance from one problem to the next in a series, only if he provides a correct answer, but if he fails to do so, he is required to reconsider and try again. Thus the reward given to the student is freedom to move ahead, and punishment takes the form of having to repeat the lesson.

Among such self-scoring devices are those disclosed in the Twyford Pat. 2,983,054 and in Hoernes et al. Pat. 3,221,418, in which cards containing problems are advanced only when the student presses a correct button in a scoring machine. Such devices, while effective, are relatively complex electrically and mechanically, and are costly.

Accordingly, it is the main object of this invention to provide a self-scoring instruction book which may be mass-produced and sold at very low cost, which book is capable of presenting teaching information and multiple-choice problems.

More specifically, it is an object of this invention to provide a book of the above type, whose pages or sheets may be advanced only if the student is able to correctly answer the problem posed.

A significant feature of the invention is that the answering system is such that the student may also be scored on the degree to which his answer is correct, whereby if the answer is perfectly correct, he may be permitted to skip a number of succeeding pages and advance rapidly, but if the answer is only partially correct, he is permitted to advance one page but is required to read the succeeding pages, whereas if he is wrong, his progress is arrested.

Briefly stated, these objects are attained in a self-scoring instruction book comprising a stack of loose sheets partially received within a box-like pocket having a row of holes therein overlying the margin of the sheets, the book having hinged covers for holding the sheets within the pocket when not in use. Printed on each sheet is instructional data or a problem related to data, followed by multiple-choice answers, only one of which is correct, or both data and a problem. The number of choices in the series of answers is equal to the number of holes in the row.

Punched in the margin of each sheet is a row of holes which lie in registration with those in the pocket, one hole being extended to the edge of the sheet to define an open slot, the position of which corresponds with the position of the correct answer in the series thereof on the same sheet. Thus when a probe is inserted by a student in that hole of the pocket which registers with the slot in the sheet therebelow, the student having chosen the correct answer, is then free to remove the sheet from the pocket to advance his lesson and to skip one or more succeeding sheets if these sheets contain like-positioned slots. But if the probe is inserted in a wrong pocket hole, it engages a hole in the sheet therebelow to pin the sheet against removal.

For a better understanding of the invention, as well as other objects and further features thereof, reference is made to the following detailed descriptiton to be read in conjunction with the accompanying drawing, wherein.

Figure 1:
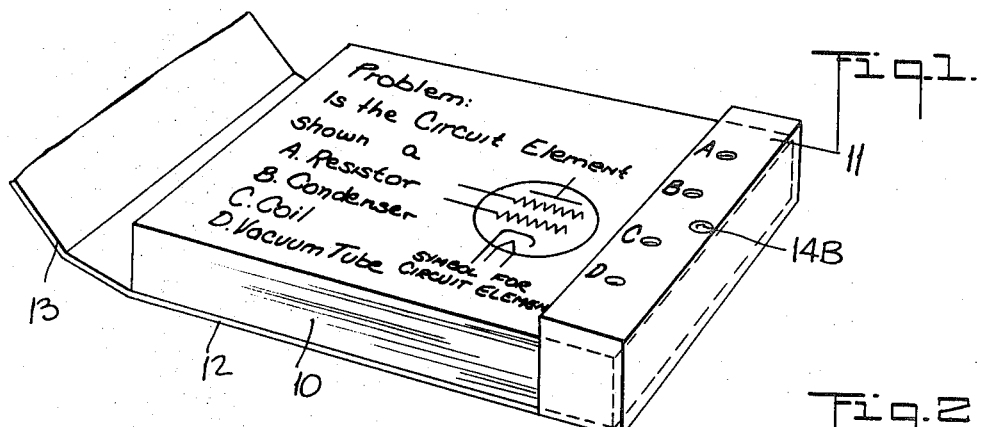
FIG. 1 is a perspective view of a self-scoring book in accordance with the invention, the book being opened for use.
Figure 2:
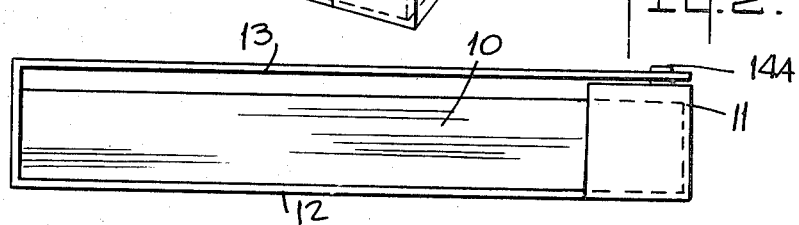
FIG. 2 is a side view of the book when closed.
Figure 3:
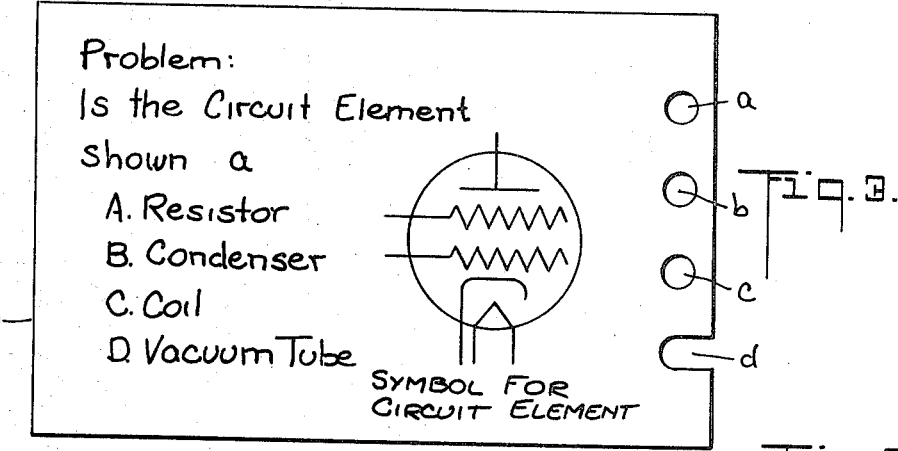
FIG. 3 shows a typical sheet in the book.

Referring now to the drawings, and more particularly to FIGS. 1, 2 and 3, a self-scoring and instructional book in accordance with the invention is constituted by a stack of loose pages or sheets 10, which stack is partially received in a box-like pocket 11 attached to one end of a bottom cover 12. Cover 12 is hinged by a spine to a top cover 13, and when the book is closed, the top cover is connected by a snap button made up of complementary elements 14A and 14B, to the top wall of pocket 11.

Pocket 11 is formed of a suitable material, such as cardboard or vinyl, the top wall having a row of holes A, B, C and D punched therein. These holes lie in registration with holes $a$, $b$, $c$ and $d$ punched in a row adjacent the margin of each sheet 10 received within the pocket.

Each sheet 10 has printed thereon instructional information or a problem related to subject-matter being taught, followed by a multiple-choice series of answers, or both information and a multiple-choice problem. Assuming, for example, a book intended to teach elementary electronics, the sheet in FIG. 3 may have printed thereon a symbol for a vacuum tube, the problem presented being whether the circuit element illustrated is ($a$) a resistor, ($b$) a condenser, ($c$) a coil, or ($d$) a vacuum tube. Thus the student has a multiple-choice series of four possible answers, only one of which is correct.

It is to be understood that the actual number of holes in the pocket and the like number on each sheet, depends on the number in the multiple-choice series, and that in practice, any plurality may be used. Also, in practice, some of the sheets in the stack may contain only teaching information, with others containing only problems relating to previously presented data.

Figure 4:
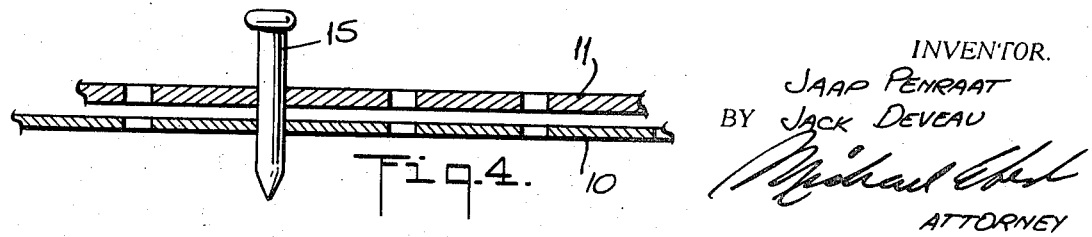
FIG. 4 shows in section a probe inserted in a pocket hole of the book and engaging a hole in the underlying sheet.

Returning to the problem at hand, the student, using a probe 15, as shown in FIG. 4, inserts the probe in that lettered hole A, B, C or D, in the pocket, which in his judgment corresponds to the position of the correct answer. It will be seen in FIG. 3, that hole $d$, which corresponds to answer D, the only correct answer to the problem, is extended to the edge of the sheet, thus defining an open slot.

If probe 15 is inserted in pocket holes A, B or C, it will engage corresponding holes $a$, $b$ or $c$ in the sheet underlying the pocket, and the probe will pin the sheet against displacement. If, however, probe 15 is inserted in pocket hole D, it will engage the open slot $d$, hence the student, despite the insertion of the probe, is free to withdraw the sheet from the pocket. Thus the student who gives the correct answer is permitted to withdraw the problem sheet and advance to the next sheet, but if he gives a wrong answer, his progress is arrested.

Thus far the book has been described as it operates in "either-or" fashion, which is to say, that the student moves ahead on step only if he gives a correct answer, and is held back if he fails to do so. But the educational process has nuances which should be taken into account in determining the learning rate.

For example, let us assume that the problem presented is whether a particular transistor circuit is ($a$) a pulse generator, ($b$) an amplifier, ($c$) a flip-flop multivibrator, or ($d$) a rectifier, and the circuit in fact is a flip-flop multivibrator. Then answers $b$ and $d$ are entirely wrong, answer $c$ is precisely true, and answer $a$ is also correct for a flip-flop multivibrator is a specific form of pulse generator.

Figures 5, 6:
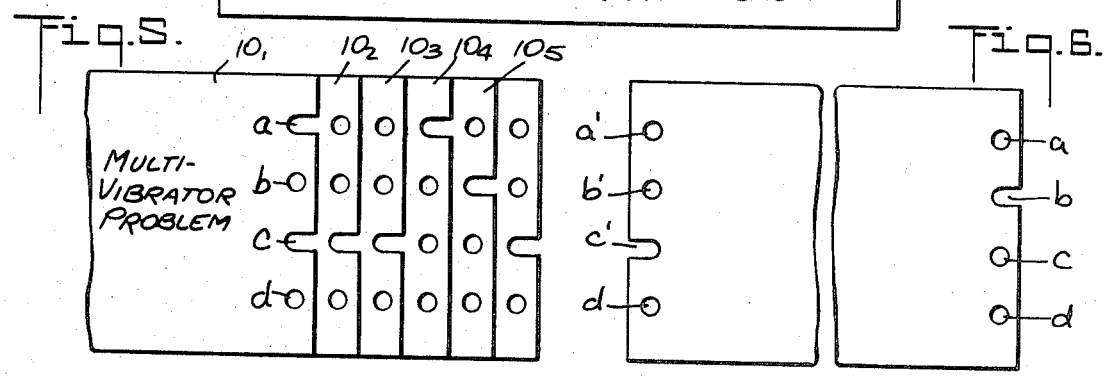
FIG. 5 illustrates a series of sheets which have been fanned out to show the slot and hole formations therein.
FIG. 6 shows a sheet both sides of which are usable in a book according to the invention.

By giving answer $c$, the student is clearly knowledgeable and may be permitted to skip succeeding instructional material which he no longer needs, but if he has given answer $a$, then he is on the right track but needs further, more detailed instruction. In order to permit the bright student who has given answer $c$ to skip, the sheets $10_1$, $10_2$, etc., as shown in FIG. 5, are arranged so that top sheet 10, which presents this problem, has a slot position $a$, as well as a slot position $c$, so that if the student gives either answer, he can pull out the sheet to advance. However, if the probe is inserted in hole C of the pocket, which is the position for the perfectly correct answer $c$, then the student is also able to pullout skip sheets $10_2$ and $10_3$, for these sheets also have slots at the $c$ position.

However, if the answer given is $a$, which is correct but not the perfect answer, then the student can advance only one sheet, for succeeding sheets do not have a slot at this position.

By punching holes and slots in both margins of the sheets, one is able to use both sides thereof. Thus in FIG. 6, sheet 10X has a row of holes $a$, $b$, $c$ and $d$, and $a'$, $b'$, $c'$ and $d'$ on both margins. Hence the student, when he runs through the stack on one side, reinserts the stack in the pocket on the reverse side, to continue his lessons.

While there has been shown and described a preferred embodiment of self-scoring instruction book in accordance with the invention, it will be appreciated that many changes and modifications may be made therein without, however, departing from the essential spirit of the invention as defined in the annexed claims.

What we claim is:

1. A self-scoring instruction book comprising:
   (a) a stack of loose sheets each having printed thereon instructional data or a problem relating to said data followed by a multiple-choice series of possible answers, or both data and a problem, said sheets having a row of marginal holes therein, the number of holes being equal to the number in the series, the hole corresponding to the precisely correct answer being extended to the edge of the sheet to define an open slot, at least one of the sheets having two open slots, one of which represents said precisely correct answer and the other of which represents a generally correct answer, one or more of the succeeding sheets in the stack having slots at the same position as said one slot to permit skipping of the succeeding sheets when a precisely correct answer is given, and
   (b) a box-like pocket for partially receiving the stack of sheets and having a row of holes overlying the holes in the sheets and in registration therewith, whereby a probe inserted in that hole in the top sheet in the stack having a slot representing the generally correct answer will engage said slot to permit withdrawal of the top sheet, and when inserted in that hole in the top sheet having a slot representing the precisely correct answer will permit withdrawal of the top sheet and those succeeding sheets which have slots at the same position as the slot representing the precisely correct answer, and a probe inserted in the other holes will engage holes in the sheet to pin the sheet to the pocket and prevent withdrawal thereof.

2. A book as set forth in claim 1, wherein said pocket is secured to the edge of a bottom cover whose other edge is hinged to a top cover which is attachable to said pocket to close the book.

3. A book as set forth in claim 1, wherein said sheets in the stack have a row of holes and slots on both margins thereof to permit use of both sides of the sheets.

References Cited

UNITED STATES PATENTS

| | | | |
|---|---|---|---|
| 2,264,889 | 12/1941 | Reynolds | 283—6 |
| 3,122,844 | 3/1964 | Kharasch et al. | 35—9 |
| 3,283,417 | 11/1966 | Lohmar | 35—9 |
| 3,221,418 | 12/1965 | Hoernes et al. | 35—9 |

WILLIAM H. GRIEB, Primary Examiner